United States Patent
Matten et al.

(10) Patent No.: US 9,700,831 B2
(45) Date of Patent: Jul. 11, 2017

(54) COLUMN

(71) Applicant: LINDE AKTIENGESELLSCHAFT, Munich (DE)

(72) Inventors: Christian Matten, Pullach (DE); Christian Pfeiffer, Pullach (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 565 days.

(21) Appl. No.: 13/680,227

(22) Filed: Nov. 19, 2012

(65) Prior Publication Data

US 2013/0125751 A1    May 23, 2013

(30) Foreign Application Priority Data

Nov. 22, 2011 (DE) .................. 10 2011 119 148

(51) Int. Cl.
*B01D 53/14* (2006.01)
*B01D 3/16* (2006.01)
*B01D 53/18* (2006.01)

(52) U.S. Cl.
CPC .......... *B01D 53/1406* (2013.01); *B01D 3/16* (2013.01); *B01D 53/1475* (2013.01); *B01D 53/18* (2013.01); *Y02C 10/04* (2013.01); *Y02C 10/06* (2013.01); *Y02P 70/34* (2015.11)

(58) Field of Classification Search
CPC .. B01D 3/16; B01D 53/1406; B01D 53/1475; B01D 53/18; Y02C 10/04; Y02C 10/06
See application file for complete search history.

(56) References Cited

U.S. PATENT DOCUMENTS

| | | | | |
|---|---|---|---|---|
| 3,109,870 A | * | 11/1963 | Kuhn ....................... | B01D 3/14 159/18 |
| 3,567,193 A | * | 3/1971 | Diery et al. ........... | B01D 3/205 261/114.5 |
| 4,192,835 A | * | 3/1980 | Powers ................... | B01D 3/18 261/114.1 |
| 4,382,901 A | * | 5/1983 | Thomas ................. | B01D 3/163 137/512.1 |
| 4,698,138 A | * | 10/1987 | Silvey ..................... | B01D 3/20 202/158 |

(Continued)

*Primary Examiner* — Amber R Orlando
*Assistant Examiner* — Britanny Precht
(74) *Attorney, Agent, or Firm* — Millen, White, Zelano, Branigan, P.C.

(57) ABSTRACT

The invention relates to a column comprising a jacket that bounds at least a first jacket space (M) and a second jacket space arranged thereabove along the longitudinal axis (L). The e first jacket space is separated from the second jacket space by a gas-permeable first chimney tray. A gaseous phase flows upward into the first jacket space, through the first chimney tray into the second jacket space, and then flows upward into the second jacket space. In the first jacket space the gaseous phase (M), in counter-current flow, contacts a first liquid washing agent, and in the second jacket space the gaseous phase, in counter-current flow, contacts a second liquid washing agent. The first chimney tray has a separator for separating the second washing agent, which separates the second washing agent (W') and directs it into the second jacket space. The invention further relates to an apparatus comprising the column and a method for separating $CO_2$ from a gaseous phase.

16 Claims, 2 Drawing Sheets

(56) References Cited

U.S. PATENT DOCUMENTS

| | | | | |
|---|---|---|---|---|
| 4,744,929 A * | 5/1988 | Robinson | ............... | B01J 19/305 202/158 |
| 5,000,883 A * | 3/1991 | Leva | ................ | B01J 19/305 261/97 |
| 5,338,517 A * | 8/1994 | Evans, III | ............... | B01D 3/009 203/DIG. 6 |
| 5,690,708 A * | 11/1997 | Danckaarts | .............. | B01D 3/20 202/158 |
| 5,837,105 A * | 11/1998 | Stober | ................ | B01D 3/20 202/158 |
| 6,059,934 A * | 5/2000 | Stober | ................ | B01D 1/30 202/158 |
| 6,123,323 A * | 9/2000 | Yoneda | ................ | B01D 3/16 261/113 |
| 7,118,098 B2 * | 10/2006 | Thiel | ............... | B01D 3/20 203/71 |
| 7,118,654 B2 * | 10/2006 | Hammon | .............. | B01D 3/24 202/110 |
| 7,424,999 B2 * | 9/2008 | Xu | ................ | B01D 1/305 261/110 |
| 8,083,901 B2 * | 12/2011 | Sharma | ............... | B01D 1/305 202/158 |
| 8,408,026 B2 * | 4/2013 | Kovak | ............... | B01D 3/008 202/158 |
| 2004/0206617 A1 * | 10/2004 | Diehl | ................ | B01D 3/324 203/8 |
| 2009/0049864 A1 * | 2/2009 | Kovak | ............... | B01D 3/008 62/643 |

* cited by examiner

COLUMN

SUMMARY OF THE INVENTION

The invention relates to a column (material-exchange column) for separating $CO_2$ from a $CO_2$-containing gaseous phase. Preferably, $CO_2$ is removed or separated as a contaminant from a hydrocarbon-containing gas, in particular natural gas.

Such material-exchange columns serve to ensure intensive contact and material exchange between a gaseous phase and a liquid phase. In this case, gaseous and liquid phases pass one another in counter-current, whereby the gaseous phase in most cases flows from the bottom to the top through the column. Such columns are used, for example, to clean a gas phase with a liquid washing agent. The gas phase that flows from the bottom to the top comes into intensive contact in the material-exchange column with the liquid phase that flows from the top to the bottom, by which when a suitable washing agent in the liquid phase is selected, disruptive components can be washed out of the gas phase.

Columns with different liquids and different amounts of liquid (e.g., 1000 $m^3$/h in an upper second jacket space and 1 $m^3$/h in a lower first jacket space) must usually be separated from one another in a gas-tight manner, since even a small "carry under," i.e., overflowing of liquid through a gas-conducting connection of the two jacket spaces downward, makes operation of the lower column section impossible. The liquid level at the bottom of the lower section (first jacket space) increases too quickly, and the washing liquid of the lower circuit is contaminated by the washing liquid from the upper circuit. As a result, the lower column section can no longer fulfill its purpose. Also, the contaminated liquid may have to be treated, at considerable expense. This problem exists in particular in idling, i.e., without a nominal gas flow in the case of circulating liquid (which when the gas flow is interrupted is often not turned off—e.g., because of the risk of freezing). For this idling, it was determined experimentally that a gas flow in the chimney tray, which is countercurrent to the flow of the gas during operation, can result. This is especially the case when a material-exchange packing or the like is installed above the chimney tray.

Therefore, an aspect of this invention is to develop a column of the above-mentioned type, having a design that saves installation space and simultaneously avoids excessive "carry under."

Upon further study of the specification and appended claims, other aspects and advantages of the invention will become apparent.

Thus, in accordance with the invention there is provided a column, for separating $CO_2$ from a $CO_2$-containing gaseous phase, comprising:

a jacket, which extends—relative to a state of the column that is arranged as directed—along a longitudinal axis that runs parallel to the vertical, whereby the jacket bounds at least a first jacket space and a second jacket space arranged thereabove along the longitudinal axis, whereby the first jacket space is separated from the second jacket space by a gas-permeable first chimney tray, whereby the column is set up for the purpose of directing the gaseous phase upward into the first jacket space along the longitudinal axis, directing the gaseous phase over the first chimney tray into the second jacket space, and then directing the gaseous phase upward into the second jacket space along the longitudinal axis, whereby the column is set up and provided for the purpose of contacting the gaseous phase in the first jacket space in counter-current flow with a first liquid washing agent in the form of water in order to wash water-soluble components out of the gaseous phase, and whereby the column is set up and provided for the purpose of contacting the gaseous phase in the second jacket space in counter-current flow with a second liquid washing agent that is different from the first washing agent, the second washing agent in particular containing methyl diethanolamine, in order to wash $CO_2$ out of the gaseous phase, and whereby the first chimney tray has a separator for separating the second washing agent, which is designed in such a way that the second washing agent that is separated by the separator is directed back into the second jacket space.

Accordingly, a column according to the invention for separating $CO_2$ from a $CO_2$-containing gaseous phase is distinguished by a (pressurized) jacket, which extends—relative to a state of the column that is arranged as directed—along a longitudinal axis that runs parallel to the vertical. The jacket surrounds at least a first jacket space and a second jacket space arranged thereabove along the longitudinal axis. The first jacket space is separated from the second jacket space by a gas-permeable first chimney tray.

In the column, a gaseous phase is directed upwards into the first jacket space along the longitudinal axis. The gas phase is then directed through the gas-permeable first chimney tray and into the second jacket space, and then is directed upward into the second jacket space along the longitudinal axis. In the first jacket space, the gaseous phase is exposed to (contacted with) a first liquid washing agent in counter-current flow. The first liquid washing agent can be in the form of water and thus is used to wash water-soluble components out of the gaseous phase. In the second jacket space, the gaseous phase is exposed to (contacted with) a second liquid washing agent, in counter-current flow, wherein the second liquid washing agent is different from the first washing agent. The second washing agent preferably contains methyl diethanolamine (MDEA), in order to wash $CO_2$ out of the gaseous phase. The first chimney tray has a separator for separating the second washing agent, which is designed so that the second washing agent that is separated from the separator is directed into the second jacket space, in such a way that overflowing of the second washing agent into the first jacket space, particularly when the column is idling, is prevented or suppressed. The separator can be in particular a fabric separator.

The column according to the invention preferably is set up and provided for the purpose of performing a washing-out (lye washing) of $CO_2$ from hydrocarbon-containing gases, in particular natural gas, to remove $CO_2$ from the corresponding material flow (in particular natural gas).

The first chimney tray for passage of the gaseous phase from the first jacket space into the second jacket space preferably has at least one chimney, extended along the longitudinal axis, with a chimney top that overlaps an opening of the chimney. The chimney top is arranged along the longitudinal axis some distance away from a front side of the chimney that borders the opening of the chimney, in such a way that the chimney and the chimney top define a circumferential gap. At the circumferential gap, a separator is arranged in such a way that the gaseous phase flowing upward through the chimney from the first jacket space into the second jacket space can pass only through the separator, and a second washing agent that is separated by the separator is directed or drops into the second jacket space. Preferably, the separator of the first chimney tray goes around the chimney crosswise to the longitudinal axis of the column.

In addition, the separator of the first chimney tray preferably has an inner side that faces the chimney, via which the separator rests against an outer side of the chimney of the first chimney tray that faces outward, in such a way that in the separator, the second washing agent that is separated from the gas phase and that runs downward can flow along on the outer side of the chimney (past the opening of the chimney) into the second jacket space and not into the opening of the chimney.

To support this draining of the separated second washing agent, the chimney of the first chimney tray preferably has a circumferential edge area that bounds the opening of the tray, and the edge area is beveled inward so that it assumes the shape of a flat frustum jacket (for example, for a cylindrical chimney, the edge area has a frustoconical shape). As a result, the opening of the chimney is crosswise to the longitudinal axis of the chimney, clearly some distance from the inner side of the separator, in such a way that the second washing agent that flows out onto the inner side strikes each edge area and is deflected outward (away from the opening of the chimney) and remains in the second jacket space.

In another variant of the invention, it is provided that the jacket of the column bounds another (separate) third jacket space, which is arranged along the longitudinal axis over the second jacket space. In this connection, the second jacket space in turn is preferably separated by a gas-permeable second chimney tray from the third jacket space, whereby the column is designed for the purpose of directing the gaseous phase from the second jacket space over the second chimney tray into the third jacket space and directing the gaseous phase upward in the third jacket space along the longitudinal axis. In addition, the column is preferably designed for the purpose of exposing (contacting) the gaseous phase in the third jacket space in counter-current to a third liquid washing agent in the form of water in order to wash the second washing agent entrained by the gaseous phase in normal operation out of the gaseous phase (removal of the washing agent entrainment). The second chimney tray now preferably has a separator for separating the third washing agent, which is designed and arranged in such a way that a third washing agent that is separated by the separator remains in the third jacket space, in such a way that overflowing of the third washing agent into the second jacket space is prevented or suppressed. In this case, the second chimney tray or the separator of the second chimney tray can be designed according to the first chimney tray.

Another aspect of the invention relates to the use of a column according to the invention in an off-shore plant.

Therefore, the invention also relates to an arrangement (or plant) with a column according to the invention, in which in addition, a buoyant carrier (platform, vessel, etc.) is present, on which the column is arranged. The column according to the invention is especially suitable for off-shore use because of its comparatively small basal surface (the column sections are arranged above one another).

In addition, the invention relates to a method for separating $CO_2$ from a $CO_2$-containing gaseous phase, whereby the gaseous phase in particular contains hydrocarbon, in particular natural gas, whereby the method is performed in particular with use of a column according to the invention or with use of an arrangement/system according to the invention.

In this case, the method has the steps: exposing the gaseous phase in a first jacket space in counter-current to a first liquid washing agent in the form of water in order to wash water-soluble components out of the gaseous phase, whereby the gaseous phase is directed from the bottom to the top, and directing the gaseous phase from the first jacket space into a second jacket space arranged thereabove, in which the gaseous phase is exposed in counter-current to a second liquid washing agent, in particular containing methyl diethanolamine, that is different from the first washing agent, in order to wash $CO_2$ out of the gaseous phase, whereby the two jacket spaces are connected via a separator for separating the second washing agent in such a way that in particular in idling, in which a gas stream is set up with a direction of flow that is opposite to the gaseous phase, a second washing agent entrained from the gas stream is separated or directed from the separator into the second jacket space.

In addition, the steps are preferably provided according to which the gaseous phase is directed from the second jacket space into a third jacket space that is arranged thereabove, in which the gaseous phase is exposed in counter-current to a third washing agent in the form of water (removal of the washing agent entrainment), whereby the second and third jacket spaces are connected via a separator for separating the third washing agent in such a way that in particular in idling, in which a gas stream is set with a direction of flow that is opposite to the gaseous phase, a third washing agent entrained from the gas stream is separated or directed from the separator into the third jacket space.

BRIEF DESCRIPTION OF THE DRAWINGS

Further advantages, features and examples of the present invention shall be described in the following with reference to the Figures, wherein

FIG. 1 shows a column 1, which has a jacket 10 that is extended along a longitudinal axis L, whereby the longitudinal axis L—relative to a state of the column 1 that is arranged as shown—runs parallel to the vertical Z.

Figure 1:
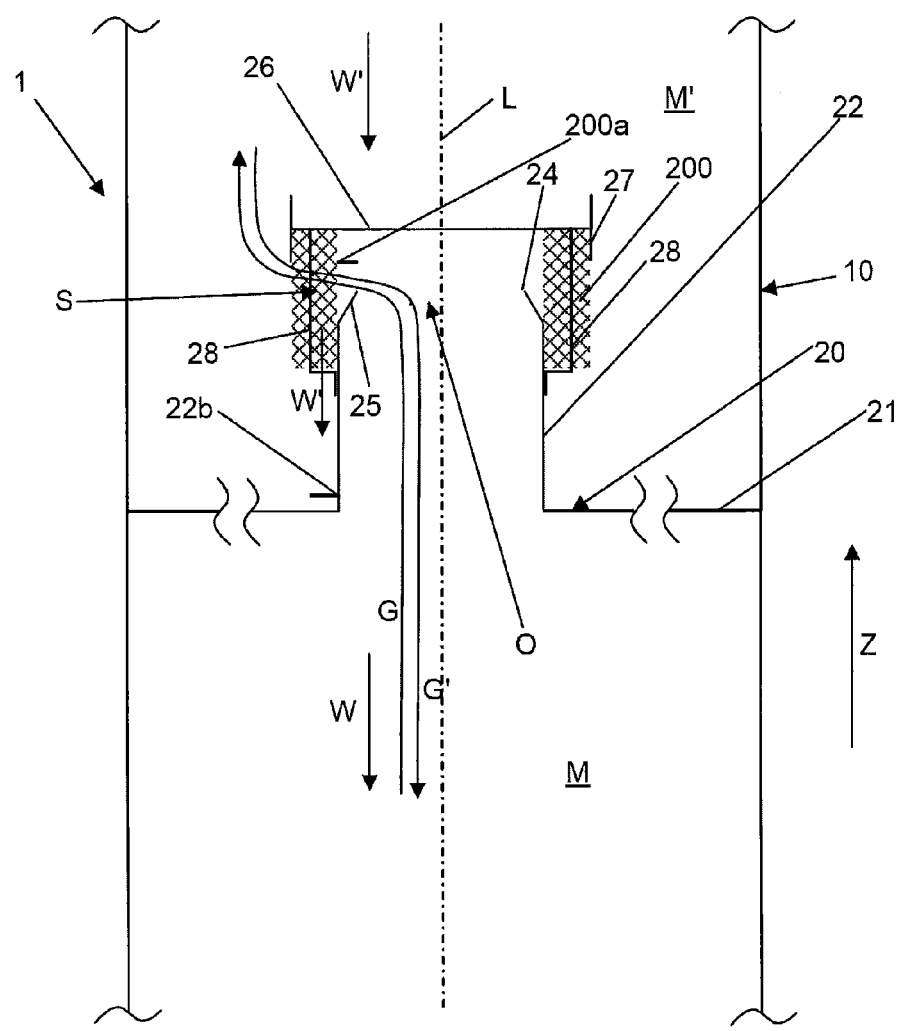
FIG. 1 shows a diagrammatic sectional view of a column according to the invention.

In this case, the jacket 10 of the column 1 bounds a first jacket space M and a second jacket spaces M', whereby the second jacket space M' is arranged along the longitudinal axis L, above the first jacket space M and is separated from the latter by a first chimney tray 20.

In the lower first jacket space M, a gaseous phase G, which is introduced into the first jacket space M and which contains, i.a., $CO_2$, is subjected to a water pre-washing. To this end, the gaseous phase G, which in the first jacket M is directed from the bottom upward along the vertical Z or longitudinal axis L, is exposed (contacted) in counter-current flow to water (first washing agent) W in order to wash water-soluble components out of the gaseous phase G (e.g., MEG, MeOH, etc.).

The first chimney tray 20 has a base 21 that is extended crosswise to the longitudinal axis L (parallel to the horizontal), from which base along the longitudinal axis L at least one chimney 22 that projects in the direction of the longitudinal axis L into the second jacket space M'. On its free end, the chimney 22 has an opening O, which is bordered by a circumferential front side 24 of the chimney 22.

Through the (at least one) opening O, the pre-washed gaseous phase G can now be directed from the first jacket space M into the second jacket space M', in which the gaseous phase G is directed from the bottom to the top along the vertical Z or the longitudinal axis L and in this case is exposed in counter-current to a second washing agent W' in the form of MDEA in order to remove CO2 from the gaseous phase G.

In this connection, in the two jacket spaces M, M' of the column 1, in particular greatly different amounts of washing agents W, W' are used.

Thus, for example, for the MDEA wash in the upper part M' of the column 1, an amount of liquid (amount of the second washing agent W') of approximately 900 m$^3$/h can be used, while the amount of the first washing agent (water) W in the lower part M of column 1 can be only approximately 0.9 m$^3$/h.

In this connection, it is to be considered that in idling, in which the washing agents W, W' circulate, but no gaseous phase is fed into the column 1, it results in a gas flow G' whose direction of flow runs opposite to that of the gaseous phase G, namely along the vertical Z from top to bottom. For the case that significantly more second washing agent W' than first washing agent W circulates, therefore, without the measure according to the invention, a "carry under" sets in comparatively quickly, in which the second washing agent W' contaminates the first washing agent W.

To be able to effectively prevent specifically the above during idling (as well as also during normal operation with a running supply of the gaseous phase G), the chimney 22 of the first chimney tray 20 is covered by means of a chimney top 26, which projects circumferentially along the horizontal via an outer side 22b of the chimney 22 that is extended along the longitudinal axis L in such a way that second washing agent W' that drops downward along the longitudinal axis L cannot enter the opening O. In addition, a separator 200 that seals the gap S in the form of a fabric separator, with one inner side 200a facing inward and which rests on the outer side 22b of the chimney 22, is arranged in the circumferential gap S that is defined by the chimney top 26 and the chimney 22, via which gap the gaseous phase G can flow from the first jacket space M into the second jacket space M'. In this connection, the chimney 22 has a circumferential edge area 25 that borders the opening O and that is tilted inward, i.e., away from the inner side 200a of the separator 100, in such a way that (separated) second washing agent W' that drains on the inner side 200a is deflected from the edge area 25 outward into the second jacket space M'. Because of the fact that the separator 200 goes around the outside of the outer side 22b of the chimney 22 and in this process is encompassed by a (circumferential) draining spout 27 that projects downward from chimney top 26 along the longitudinal axis L, the separator 200, on the one hand, is not directly exposed from above to the dropping second washing agent W' and, on the other hand, can release second washing agent W' that is taken up and separated from the second jacket space M' in the gas backflow mode (idling, see above) downward in the direction onto the base 21 of the first chimney tray 20 (past the opening O of the chimney 22) into the second jacket space M'.

In this connection, it is ensured as a result that the gaseous phase G can pass from the first jacket space (water prewashing) into the second jacket space (CO2-absorber) M'; however, a contamination of the first washing agent W with the second washing agent W' is suppressed or completely avoided.

Preferably, the chimney top 26 is connected to the chimney 22 via at least one longitudinally extended fastening element 28. In this case, the at least one fastening element 28 can be surrounded by the separator 200.

Figure 2:
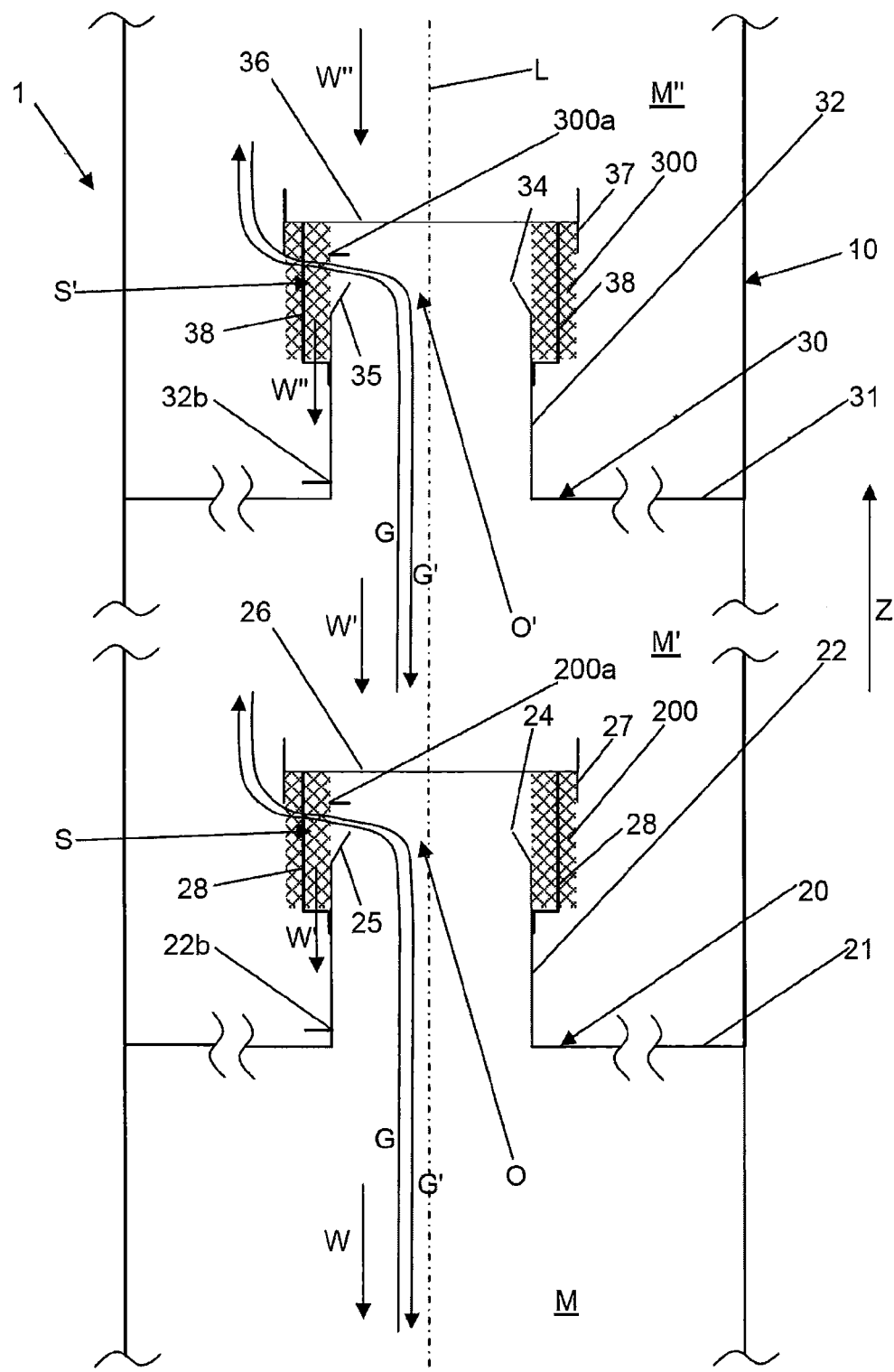
FIG. 2 shows a diagrammatic sectional view of another column according to the invention.

In accordance with FIG. 2, according to another embodiment of the invention, in addition it is provided to place a third jacket space M" for performing a water backwash on the second jacket space M' according to FIG. 1. In this connection, the jacket 10 of the column 1 also bounds the third jacket space M", which is separated by a second chimney tray 30 from the second jacket space M', whereby the gaseous phase G can pass directed through an opening O' of a chimney 32 of the second chimney tray 30 into the third jacket space M", where the gaseous phase G is exposed in counter-current to a third washing agent W"' in the form of water in order to wash the washing agent entrainment (second washing agent W') out of the second jacket space M'. Here, in the case of "carry under" and greatly different quantitative ratios (e.g., W"'<<W'), the hold-up in the space M" would be too greatly reduced, so that the pumps for circulation of W"' would be jeopardized by drying out of the third jacket space. Here, a contamination of the first washing agent W' with the third washing agent W"' is the smaller problem.

In this connection, to prevent a "carry under" of the third jacket space M" into the second jacket space M', the chimney 32 of the second chimney tray 30 is covered in the same way by means of a chimney top 36, which in turn projects circumferentially along the horizontal via an outer side 32b of the chimney 32 of the second chimney tray 30 that is extended along the longitudinal axis L. In this case, the chimney top 36 and the underlying chimney 32 of the second chimney tray 30 define a circumferential gap S', via which the gaseous phase G can enter from the second jacket space M' into the third jacket space M", whereby in each gap S', a separator 300 in the form of a fabric separator that seals the gap S' is also arranged, which separator rests with its inner side 300a facing inward on the outer side 32b of the chimney 32 of the second chimney tray 30.

Also, the chimney 32 of the second chimney tray 30 preferably has a circumferential edge area 35 that borders the opening O' and that is tilted inward in such a way that the third washing agent W"' that drains on the inner side 300a is deflected from the edge area 35 outward into the third jacket space M".

Thus, also in the third jacket space M" because of the fact that the separator 300 of the second chimney tray 30 goes around the outside of the outer side 32b of the chimney 32 and in this process is encompassed by a draining spout 37 that projects downward from the chimney top 26 along the longitudinal axis L, it is ensured that the separator 300 is not directly exposed from above by the dropping third washing agent W"' and for its part can release third washing agent W"' that is taken up and separated from the third jacket space M", in particular during idling, downward onto the base 31 of the second chimney tray 30 (past the opening O' of the chimney 32) into the third jacket space M".

As a result, the column 1 according to the invention therefore advantageously makes possible a reduction of the space requirement, since multiple washes can be arranged above one another in a column 1, which accompanies a reduction in costs for the necessary devices and corresponding tubing. Since significantly shorter lines can be used to direct the gaseous phase, the gas pressure loss can also be reduced.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application No. 10 2011 119 148.1, filed Nov. 22, 2011, are incorporated by reference herein.

REFERENCE SYMBOL LIST

| | |
|---|---|
| 1 | Column |
| 10 | Jacket |
| 20 | First Chimney Tray |
| 21, 31 | Base |
| 22, 32 | Chimney |
| 22b, 32b | Outer Side |
| 24, 34 | Front Side |
| 25, 35 | Edge Area |
| 26, 36 | Chimney Top |
| 27, 37 | Draining Spout |
| 28, 38 | Fastening Means |
| 200, 300 | Separator |
| 200a, 300a | Inner Side |
| S, S' | Gap |
| L | Longitudinal Axis |
| M | First Jacket Space |
| M' | Second Jacket Space |
| M" | Third Jacket Space |
| G | Gaseous Phase |
| G' | Gas Stream in Idling |
| W | First Washing Agent |
| W' | Second Washing Agent |
| W" | Third Washing Agent |
| Z | Vertical |

The invention claimed is:

1. A column for separating $CO_2$ from a $CO_2$-containing gaseous phase, said column comprising:
   a jacket (10), which extends along a longitudinal axis (L), wherein said jacket (10) bounds at least a first jacket space (M) and a second jacket space (M') arranged above said first jacket space (M) along said longitudinal axis (L),
   a gas-permeable first chimney tray (20) having a base (21) and at least one chimney (22), said base (21) extending in a direction crosswise to said longitudinal axis (L), said least one chimney (22) extending in the direction of said longitudinal axis (L), and a chimney top (26) that overlaps an opening (O) of said at least one chimney (22), wherein said first jacket space (M) is separated from said second jacket space (M') by said gas-permeable first chimney tray (20) with said first jacket space (M) being positioned below said base (21) and said second jacket space (M') being positioned above said base (21), whereby a gaseous phase (G) flowing upward through said first jacket space (M) along said longitudinal axis (L) can pass through said at least one chimney (22) of said first chimney tray (20) into said second jacket space (M'),
   wherein said first chimney top is arranged in the direction of longitudinal axis (L) some distance away from a front side (24) of said at least one chimney (22) and borders said opening (O) of said at least one chimney (22) in such a way that said at least one chimney (22) and said chimney top (26) define a circumferential gap (S),
   wherein said column (1) is designed to contact a gaseous phase (G) in the first jacket space (M), in counter-current flow, with a first liquid washing agent (W) in the form of water in order to wash water-soluble components out of gaseous phase (G), and
   said first chimney tray (20) having a separator (200) for separating a second washing agent (W'), flowing counter current to gaseous phase (G) in said second jacket space (M'), said separator being permeable to gaseous phase (G) flowing upward through the chimney from the first jacket space into the second jacket space and said separator being designed so that second washing agent (W') is separated by the separator (200) and directed into said second jacket space (M') and is suppressed from flowing into said first jacket space (M), and said separator (200) being positioned in said circumferential gap (S) and arranged in such a way that gaseous phase (G) can pass only through said separator (200) from said first jacket space (M) into said second jacket space (M'), and second washing agent (W') that is separated by said separator (200) flows into said second jacket space (M'),
   wherein said separator (200) goes around said chimney (26) crosswise to the longitudinal axis (L) of said column, and said separator (200) has an inner side (200a) that faces said at least one chimney (22), which inner side rests against an outer side (22b) of said at least one chimney (22), in such a way that in said separator (200), second washing agent (W') flows downward along said outer side (22b) of said at least one chimney (22) into said second jacket space (M'),
   wherein said chimney top (26) is connected to said at least one chimney (22) via at least one longitudinally extended fastening element (28), and said at least one fastening element (28) is surrounded by said separator (200), and
   wherein said first chimney tray and said separator are adapted to direct the second washing agent separated from the separator into said second jacket space, and are adapted to suppress overflow of the second washing agent into said first jacket space.

2. The column according to claim 1, wherein said at least one chimney (22) has a circumferential edge area (25) that bounds said opening (O) of said at least one chimney (22), and said circumferential edge area is made in the shape of a flat frustum jacket.

3. The column according to claim 1, wherein said jacket (10) also bounds a third jacket space (M"), which is arranged in the direction of said longitudinal axis (L) above said second jacket space (M'), wherein said second jacket space (M') is separated by a gas-permeable second chimney tray (30) from said third jacket space (M"), and wherein said column (1) is designed for directing gaseous phase (G) from said second jacket space (M') through said second chimney tray (30) into said third jacket space (M") and directing gaseous phase (G) upward in said third jacket space (M") along said longitudinal axis (L), and wherein said column (1) is designed to contact gaseous phase (G) in said third jacket space (M"), in counter-current flow, with a third liquid washing agent (W") in the form of water, and wherein said second chimney tray (30) has a further separator (300) for separating third washing agent (W"), said further separator (300) being designed in such a way that a third washing agent (W") that is separated by said separator (300) is directed into said third jacket space (M"), for gaseous phase (G) to flow from said second jacket space (M') into said third jacket space (M") wherein said second chimney tray (30) has at least one chimney (32), extended along said longitudinal axis (L), with a chimney top (36) that overlaps an opening (O') of said at least one chimney (32), which chimney top is arranged in the direction of said longitudinal axis (L) at some distance from a front side (34) of said at least one chimney (32) that borders said opening (O') of said at least one chimney (32), in such a way that said at least one chimney (32) and said chimney top (36) define a circumferential gap (S'), and said separator (300) is arranged in such a way that gaseous phase (G) can pass only through said separator (300) from said second jacket space (M') into said third jacket space (M"), and a third washing agent (W") that is separated by said separator (300) flows into said third jacket space (M").

4. An apparatus comprising a column according to claim 1, wherein said column is arranged on a buoyant carrier.

5. The apparatus according to claim 4, wherein said buoyant carrier is a platform or a vessel.

6. A method for separating $CO_2$ from a $CO_2$-containing gaseous phase in a column according to claim 1, said method comprising:
   contacting a $CO_2$-containing gaseous phase (G) in said first jacket space (M) of said column, in counter-current flow, with a first liquid washing agent (W) in the form of water to wash water-soluble components out of said gaseous phase (G), wherein said gaseous phase is directed from the bottom to the top of said first jacket space (M),
   directing said gaseous phase from said first jacket space into said second jacket space (M') of said column wherein said gaseous phase (G) is contacted, in counter-current flow, with a second liquid washing agent (W') to wash $CO_2$ out of said gaseous phase (G),
   wherein said first jacket space (M) and said second jacket space (M') are connected via said separator (200) for separating said second washing agent (W') in such a way that, during idling, second washing agent (W') that is entrained in another gas stream (G'), which has a direction of flow that is opposite to the flow of said gaseous phase (G), is separated by said separator (200) and flows into said second jacket space (M').

7. The method according to claim 6, wherein said $CO_2$-containing gaseous phase contains hydrocarbons.

8. The method according to claim 7, wherein said $CO_2$-containing gaseous phase is natural gas.

9. The method according to claim 6, wherein said second washing agent (W') contains methyl diethanolamine.

10. The method according to claim 6, further comprising:
    directing said gaseous phase (G) from said second jacket space into a third jacket space (M") of said column that is above said second jacket space, in wherein said gaseous phase (G) is contacted, in counter-current flow, with a third washing agent (W") in the form of water,
    wherein said second jacket space (M') and said third jacket spaces (M") are connected via a separator (300) for separating said third washing agent (W") in such a way that, during idling, third washing agent (W") that is entrained in a further gas stream (G'), which has a direction of flow that is opposite to the flow of said gaseous phase (G), is separated by said separator (300) and flows into said third jacket space (M").

11. The method according to claim 6, wherein said column is arranged on a buoyant carrier.

12. The column according to claim 1, wherein said separator (200) is in the form of a fabric separator, wherein one inner side (200a) facing inward and which rests on the outer side (22b) of said at least one chimney (22).

13. The column according to claim 1, wherein said at least one chimney (22) has a circumferential edge area (25) that borders said opening (O) and is tilted inward away from an inner side (200a) of said separator (200).

14. The column according to claim 1, wherein said chimney top (26) has a circumferential draining spout (27) that projects downward from said chimney top (26) along said longitudinal axis (L).

15. The column according to claim 1, wherein said at least one chimney (22) does not extend below said base (21) of said gas-permeable first chimney tray (20).

16. A column for separating $CO_2$ from a $CO_2$-containing gaseous phase, said column comprising:
    a jacket (10), which extends along a longitudinal axis (L), wherein said jacket (10) bounds at least a first jacket space (M) and a second jacket space (M') arranged above said first jacket space (M) along said longitudinal axis (L),
    a gas-permeable first chimney tray (20) having a base (21) and at least one chimney (22), said base (21) extending in a direction crosswise to said longitudinal axis (L), said least one chimney (22) extending in the direction of said longitudinal axis (L), and a chimney top (26) that overlaps an opening (O) of said at least one chimney (22), wherein said first jacket space (M) is separated from said second jacket space (M') by said gas-permeable first chimney tray (20) with said first jacket space (M) being positioned below said base (21) and said second jacket space (M') being positioned above said base (21), whereby a gaseous phase (G) flowing upward through said first jacket space (M) along said longitudinal axis (L) can pass through said at least one chimney (22) of said first chimney tray (20) into said second jacket space (M'),
    wherein said chimney top is arranged in the direction of longitudinal axis (L) some distance away from a front side (24) of said at least one chimney (22) and borders said opening (O) of said at least one chimney (22) in such a way that said at least one chimney (22) and chimney top (26) define a circumferential gap (S),
    wherein said column (1) is designed to contact a gaseous phase (G) in the first jacket space (M), in counter-current flow, with a first liquid washing agent (W) in the form of water in order to wash water-soluble components out of gaseous phase (G), and
    said first chimney tray (20) having a separator (200) for separating a second washing agent (W'), flowing counter current to gaseous phase (G) in said second jacket space (M'), said separator being permeable to gaseous phase (G) flowing upward through the chimney from the first jacket space into the second jacket space and said separator being designed so that second washing agent (W') is separated by the separator (200) and directed into said second jacket space (M') and is suppressed from flowing into said first jacket space (M), and said separator (200) is arranged in such a way that gaseous phase (G) can pass only through said separator (200) from said first jacket space (M) into said second jacket space (M'), and second washing agent (W') that is separated by said separator (200) flows into said second jacket space (M'),
    wherein said separator (200) goes around said chimney (26) crosswise to the longitudinal axis (L) of said column, and said separator (200) has an inner side (200a) that faces said at least one chimney (22), which inner side rests against an outer side (22b) of said at least one chimney (22), in such a way that in said separator (200), second washing agent (W') flows downward along said outer side (22*b*) of said at least one chimney (22) into said second jacket space (M'), wherein said at least one chimney (22) has a circumferential edge area (25) that borders said opening (O) and is tilted inward away from an inner side (200*a*) of said separator (200), and wherein said first chimney tray and said separator are adapted to direct the second washing agent separated from the separator into said second jacket space, and are adapted to suppress overflow of the second washing agent into said first jacket space.

\* \* \* \* \*